United States Patent [19]
Tanaka

[11] 4,069,308
[45] Jan. 17, 1978

[54] PROCESS AND APPARATUS FOR FORMING AEROSOLS OF PESTICIDAL CHEMICALS

[75] Inventor: Seizo Tanaka, Kanagawa, Japan

[73] Assignees: Showa Denko Kabushiki Kaisha; Sanko Kagaku Kogyo Kabushiki Kaisha, both of Tokyo, Japan

[21] Appl. No.: 630,830

[22] Filed: Nov. 11, 1975

Related U.S. Application Data

[63] Continuation of Ser. No. 398,739, Sept. 19, 1973, abandoned, which is a continuation of Ser. No. 148,045, May 28, 1971, abandoned, which is a continuation-in-part of Ser. No. 707,515, Feb. 23, 1968, abandoned.

[51] Int. Cl.$^2$ ............................................. A01N 17/02
[52] U.S. Cl. .................................... 424/43; 424/162; 424/200; 424/209; 424/210; 424/218; 424/219; 424/249; 424/250; 424/272; 424/274; 424/321; 424/352; 21/57
[58] Field of Search ............... 424/162, 249, 352, 219, 424/251, 43, 358, 321, 209, 200, 210, 274, 250, 218, 272; 21/57

[56] References Cited

U.S. PATENT DOCUMENTS

| | | | |
|---|---|---|---|
| 2,303,981 | 12/1942 | Britton et al. | 424/357 |
| 2,948,585 | 8/1960 | Fitzgibbon | 21/57 |
| 3,197,272 | 7/1965 | Regutti | 21/7 |

*Primary Examiner*—V. D. Turner
*Attorney, Agent, or Firm*—Sughrue, Rothwell, Mion, Zinn and Macpeak

[57] ABSTRACT

A process and an apparatus for forming aerosols of pesticidal chemicals, said process comprising vaporizing water in a steam generator fitted with a heater, heating the resultant steam to 110°–800° C in a superheating means, passing the superheated steam from the superheating means, while controlling its temperature, to an evaporator containing the pesticidal chemicals and connected to the steam generator through superheater thereby to effect the heating, evaporation and entrainment of the chemicals with steam, releasing the resulting entrained vapor in the air to form aerosols of the pesticidal chemicals. The aerosols are used to control indoor or outdoor fungi, bacteria, viruses, and insects.

10 Claims, 4 Drawing Figures

INVENTOR
SEIZO TANAKA

Sughrue, Rothwell, Mion,
Zinn & Macpeak
BY
ATTORNEYS

PROCESS AND APPARATUS FOR FORMING AEROSOLS OF PESTICIDAL CHEMICALS

CROSS-REFERENCE TO RELATED APPLICATIONS

This application is a continuation application of Ser. No. 398,739, filed Sept. 19, 1973, in turn a continuation application of Ser. No. 148,045, filed May 28, 1971, in turn a continuation-in-part application of Ser. No. 707,515, filed Feb. 23, 1968, all of the aforementioned prior applications having been abandonded.

BACKGROUND OF THE INVENTION

1. Field of the Invention

This invention relates to a process and an apparatus for forming aerosols of vaporizable solid-state pesticidal chemicals, and more specifically, to a process and an apparatus suited for forming aerosols of fungicides or insecticides.

The process of this invention may be applied to a wide variety of solid-state pesticidal chemicals so long as they can be formed into aerosols.

2. Description of the Prior Art

Recently, the application of pesticides in aerosol formulations has received increasing interest in the art and has been used with a wide variety of pesticides as well as fumigants as an effective means for controlling fungi, bacteria, and insects, not only in enclosed rooms such as warehouses and greenhouses, but also in open fields.

In general, processes for the application of pesticides in the form of aerosols, fogs, or atomized particles can be classified into the following types:

a. spraying the solution of pesticides (e.g., fungicides, insecticides or both) dissolved in a liquefied gas enclosed in a vessel, by utilizing the vapor pressure of the liquefied gas;

b. atomizing the solution of pesticides by means of mechanical atomization;

c. vaporization of pesticides in mixture with combustible materials by the heat of combustion; and d. vaporization of pesticides by indirect heating.

None of these known processes are completely satisfactory.

For example, process (a) has drawbacks of (i) requiring a liquefied gas in which the pesticide is dissolved, (ii) compression in a confined container, and (iii) the high cost of the liquefied gas and difficulty of handling, etc. Process (b), though being used practically in rather wide fields, still finds limited utility since it requires high pressures to atomize the pesticides finely, and a particular solvent which must (i) be inexpensive and (ii) easily handled. Process (c) has been applied as a formulation comprising a suitable mixture of pesticide with combustible materials, such as sugars, zinc dust, aluminum dust, wood powder, celluloid and similar organic materials, and optionally with an added oxygen-carrier such as salts or esters of nitric acid, perchlorate salts, chlorate salts, bichromates, peroxides, etc. Process (d) is applied by heating the pesticide directly on a heated plate or heated tube through which a liquid pesticide is passed.

The last two processes are advantageous from the viewpoint of manpower savings, but suffer from the following drawbacks:

The effect of the pesticide is greatly reduced during combustion or heating in an oxidative atmosphere, such as air, a heating mixture or a hot combustion gas, because of the oxidative decomposition of the pesticide. Moreover, excessive heating of the pesticide is inevitable at this time, and results in the acceleration of the thermal decomposition of the pesticide. The by-products formed as decomposition products during the combustion or heating of the pesticides quite often have hazardous influences on plants.

For these reasons, there has long been a demand in the art for an improved process for forming aerosols of pesticidal chemicals.

SUMMARY OF THE INVENTION

It is an object of this invention to provide a process for forming aerosols of pesticidal chemicals, especially fungicides, insecticides or mixtures thereof in much more active states than those attained by prior art processes without involving the decomposition of the pesticidal chemicals, which leads to excellent pest control effects and freedom from phytotoxicity to plants.

Another object of this invention is to provide a process for producing aerosols of fungicides, insecticides or mixtures thereof at a lower cost than the conventional processes.

These objects are achieved by the process of this invention, which comprises passing steam at a temperature of 110°–800° C on the surface of a vaporizable solid-state pesticidal material while maintaining close contact between the steam and the pesticidal material, thereby to vaporize the pesticidal material, and discharging it together with the steam to the air to form aerosols of the pesticidal material.

More particularly, the process of this invention involves the vaporization of fungicides, insecticides or a mixture thereof with at least one additive, such as a carrier, diluent, or condensation nuclei with superheated steam or its mixture with at least one other gas which is inert to the pesticidal chemical or additive thereby to vaporize a vaporizable material consisting mainly of the pesticide, and release of the resultant vaporized material into the air to form aerosols.

This invention is based on the discovery that outstandingly effective and harmless aerosols for the plant can be formed by direct introduction of superheated steam as a flowing heat source to vaporizable solid-state pesticidal ingredients or their mixtures with suitable additives in the form of a fixed zone to vaporize the ingredients and entrain the resulting vapor, and by the release of the vapor to the air to cool the vapor to form aerosols. It has also been found that the degree of degradation of the pesticidal ingredients can be greatly reduced as compared with the conventional processes.

DETAILED DESCRIPTION OF THE INVENTION

DETAILED DESCRIPTION OF THE DRAWINGS

Figure 1:
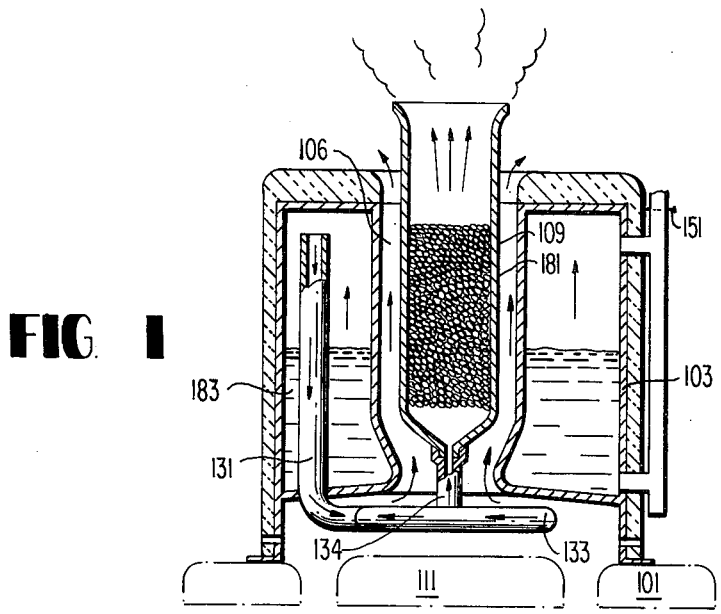
FIGS. 1, 3 and 4 each are a longitudinal sectional view of an apparatus suited for practicing the process of the present invention.

In the drawings, the last two figures refer to parts or devices having the same function. Specifically, 01 represents a base stand; 03, and water tank; 09, a receptacle of pesticidal chemical; 11, a heater; 13, a superheater;

31, a vapor tube; 33, a pipe for superheating; 51, a water supply valve; 81, pesticidal chemical; and 83, water.

Referring to FIG. 1, water 183 in water tank 103 boils by a heater 111, and steam is generated. When a valve 151 is closed at this time, the vapor fills the water tank 103 to increase the pressure. The vapor comes into a vapor tube 131, and is heated by a superheating pipe 133. The resulting superheated vapor is pressed into a receptacle 109 for a pesticidal chemical via an inlet 134 for the superheated steam. The steam vaporizes the pesticidal chemical 181 and simultaneously carries it. The pesticidal chemical is released from the receptacle 109 into the air, whereby an aerosol formulation of the pesticidal chemical is made. Air heated by the heater, when passing through a gap 106, heats the water tank 103 and at the same time serves to maintain the warmth of the receptacle 109. When the receptacle 109 is heated to some extent (to an extent which does not cause thermal decomposition), the evaporation of the pesticidal chemical becomes vigorous. The apparatus shown in FIG. 1 effects the heating of the water tank and the vapor by one heater, and is excellent because of its simplicity of structure.

Figure 2:
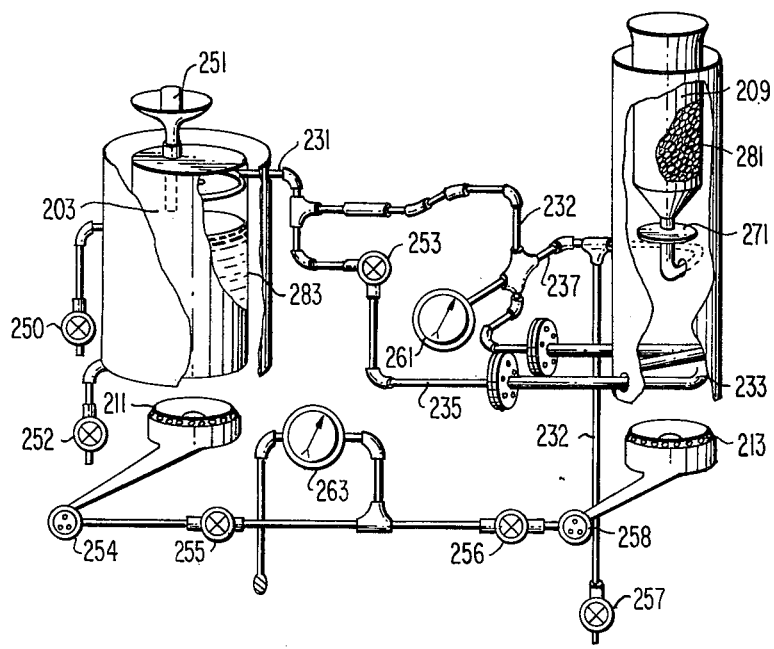
FIG. 2 is a view, partly broken away, of an apparatus suited for the practice of the process of the invention.

Referring to FIG. 2, when water 283 in water tank 203 is heated by heater 211, steam flows into vapor tube 231. The vapor tube 231 consists of two separate tubes 235 and 232. The tube 235 is fitted with a valve 253 for adjusting the amount of flowing steam. The adjusting valve may be provided in either one of the tubes 235 and 232. The steam flowing into the tube 235 is heated by heater 213 in superheating pipe 233. The superheated steam is associated with steam from the tube 232, which is not superheated, and enters receptacle 209 for the pesticidal chemical through tube 237. The mixed steam vaporizes pesticidal chemical 281, and carries it. The pesticidal chemical is then released from the upper part of the receptacle 209 to form an aerosol. A thermometer 261 is provided to measure the temperature of steam entering the tube 237. The temperature of steam entering the tube 237 is controlled by controlling the amount of steam entering superheating pipe 233 by means of the adjusting valve 253. Valve 257 serves to control the amount of steam entering the receptacle 209. The reference numeral 271 represents a plate for preventing direct contact of heat from the heater 213 with the receptacle.

The apparatus shown in FIG. 3 will be described. When a predetermined amount of water 383 is poured into a water tank 303, a level switch 316 is actuated to set an electric source 312 in operation automatically. Thus, electric current flows through a heater 311. Water in the water tank 303 is introduced dropwise into a spiral tube 333 through an orifice 379. Since a constant water level is maintained by an overflowing pipe 347, the speed of introducing water is constant. Water heated while flowing down through the spiral tube 333 gradually becomes superheated steam, and vaporizes and carries a pesticidal chemical 381 in a receptacle 309 to form its aerosol. Water which is not vaporized within the spiral tube 333 at the start of introduction is gradually discharged from a drain discharge outlet 348. Since the end portion of the drain discharge outlet is rotated as shown in the drawing, the drain tube is water sealed from the atmosphere. The height of the rotary portion must be adjusted to above the pressure of the inside of the drain tube. The pesticidal chemical flowing down in the molten state in the pesticidal chemical entraining part is discharged from a drain discharge outlet 349 having the same structure as that of the drain discharge outlet 348. The pesticidal chemical 381 in the receptacle 309 is gradually atomized with the flowing down of water 383 from the water tank 303. When the level of water in the tank 303 is lowered to a predetermined position to provide water of an amount sufficient to atomize all the pesticidal chemical, a level switch 361 sets in to cut the electric current in a heater 311 automatically. Since a dropping nozzle (orifice) 379 of the water tank 303 is not provided with a stop cock, the dropping of water continues, and because of this, the spiral tube 333 is not heated to high temperatures by the heat built up within the device. The dropped water is gradually discharged from the discharge outlet 348 with a decrease in temperature of the spiral tube 333, and when water in the water tank 303 becomes completely absent, the function of the present apparatus comes to a halt. The temperatures of inner casing 313 and an outer casing 312 considerably rise by the heat generated by the heater 311, and give undesirable effects on handling. To remove this defect, an overflowing pipe 347 and a discharge outlet 346 coming from the pipe 347 are provided in a gap between the inner and outer casings. A filter 384 made of glass fibers is disposed at the lower portion of the water tank so as to prevent the blockage of the dropping nozzle 379 of foreign matter in the water.

Figure 3:
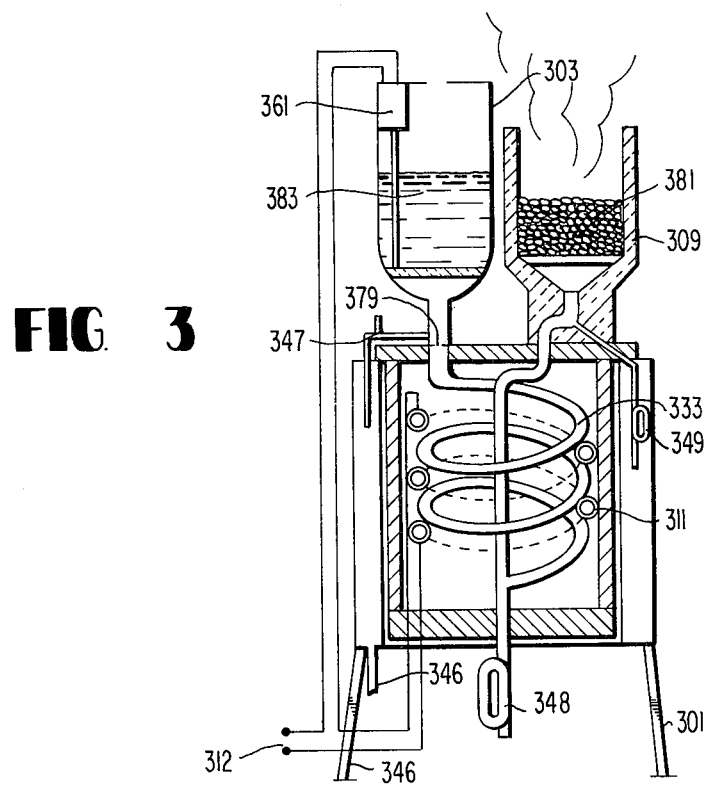

The apparatus of the type shown in FIG. 3 has the following advantages:
a. The atomizing speed, entraining temperature and entraining efficiency are suitable for use in indoor horticulture.
b. It can be used with ease and simplicity.
c. The operator need not approach the apparatus during the atomizing operation, and therefore does not suffer from any risk including toxicity of atomized pesticidal chemicals.
d. The apparatus can be easily made large-sized.
e. The waiting time until the generation of atomized pesticidal chemical is very short.

The apparatus of the type shown in FIG. 4 will now be described. A predetermined amount of water 483 is filled in a water tank 403 and a cock 451 at a water pouring opening is closed; on the other hand, a receptacle 409 is charged with a predetermined amount of a pesticidal chemical 481. When a timer 461 is adjusted to a predetermined time graduation and electricity is supplied from an electric source, water 483 in the water tank 403 is heated by a heater 411 and evaporated. The evaporated water enters a superheating pipe 433, and superheated by a superheater 413. Superheated steam vaporizes and entrains the pesticidal chemical 481 within the receptacle 409 thereby to atomize it. When most of the charged pesticidal chemical has been atomized, the supply of electricity is cut off by the timer 461. The pesticidal chemical remaining in the receptacle is all atomized by the heat built up in the apparatus. The pesticidal chemical melted by the superheated steam and flowing down from the receptacle is discharged from a drain pipe 449.

When this apparatus is used, it is necessary to exercise a proper control of the relation among the amount of water to be filled in the water tank, the amount of the pesticidal chemical to be charged, and the heating time. In other words, water of an amount sufficient to entrain all of the pesticidal chemical charged should be placed in the water tank, and the water should be heated for a time necessary for vaporizing it.

Heating the water tank without any contents in it results in the reduction of the life of the apparatus. Hence, in actual operation, considerably excessive amounts of water in comparison with the required heating time and amount of the pesticidal chemical is charged into the water tank. This obviates the necessity of strictly controlling the amount of steam according to the kind of the pesticidal chemical to be charged, namely the heating time, and also the complexity of operation.

Figure 4:
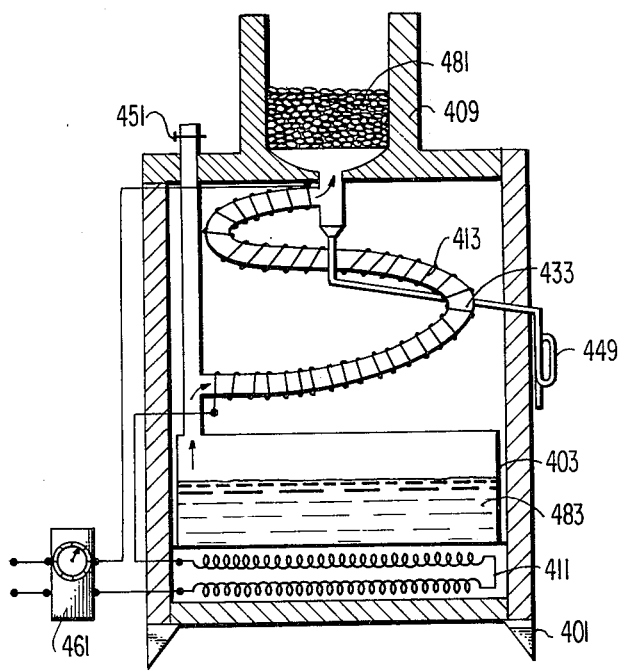

The advantages of the apparatus shown in FIG. 4 are as follows:

a. The atomizing speed, entraining temperature and entraining efficiency are suitable for use in indoor horticulture.
b. Since the heat source is electricity, there is no formation of phytotoxic matter (for example, a vapor of fuel) nor a risk of fire, and the safety of operation can be ensured.
c. The operator need not approach the apparatus during and after the atomizing operation, and therefore does not suffer from any risk including toxicity of the pesticidal chemical.
d. Since the structure of the apparatus is relatively simple, the cost is low, and there is less possibility of troubles.
e. It is easy to maintain the temperature of superheated steam constant.

Some tests were carried out by employing a wide variety of pesticides to prove that the thermal decomposition of the pesticidal ingredient scarcely takes place in the process of the present invention. In the tests, steam temperatures of 130° to 380° C were used. The results obtained are shown in Table 1 below.

Table 1

| Pesticidal ingredients | Temperature of vaporizing zone (° C) | Feeding speed of superheated steam (g/min) | P (%) |
|---|---|---|---|
| Sulfur | 105–250 | 30.0 | 99 |
| 2,2-Dichloro-6-(o-chloranilino)-1,3,5-triazine | 105–270 | 18.3 | 90 |
| Hexachlorocyclohexane | 105–210 | 4.5 | 99 |
| Dimethyl-2,2-dichlorovinyl phosphate | 105–170 | 4.0 | 96 |
| Tetrachloroisophthalonitrile | 105–240 | 28.5 | 96 |
| 6-Methylquinoxaline-2,3-dithiocarbonate | 105–240 | 32.6 | 96 |
| Dimethyl-(3-methyl-4-nitrophenyl)thiophosphate | 102–200 | 20.0 | 100 |
| Ethyl-p-cyanophenylphenyl phosphonothioate | 102–200 | 20.0 | 98.4 |
| 2-Isopropyl-4-methyl-pyrimidyl-6-diethyl-thiophosphate | 105–250 | 20.0 | 98.4 |
| N'-(dichlorofluoro-methylthio)-N,N-dimethyl phenyl sulfamide | 105–180 | 20.0 | 97.0 |
| 2-Methoxy-4H-1,3,2-benzo-dioxaphosphorine-2sulfide | 105–150 | 20.0 | 99.8 |
| 3-(3,5-Dichlorophenyl)-5,5-dimethyloxazoline-dione-2,4 | 105–250 | 20.0 | 98.8 |

These pesticidal ingredients were either mixed with, or absorbed in, solid mineral additives inert to these ingredients, even at high temperatures.

In Table 1, P represents the content of the active ingredient in the aerosol, and is calculated by the following equation:

$$P = a/s \times 100$$

wherein $a$ is the weight of the particles of the active ingredient obtained by collection using a smoke filter and a condesation device, and $s$ is the weight of the active ingredient consumed.

For comparative purposes, the values of P obtained in the conventional processes are given in Table 2 below.

Table 2

| Pesticidal ingredients | Process | Heating temperature (° C) | P (%) |
|---|---|---|---|
| 6-Methylquinoxaline-2,3-dithiocarbonate | Direct heating | 380 | 34 |
| 2,4-Dichloro-6-(o-chloranilino)-1,3,5-triazine | Pyrotechnic | 300–320 | 20 |
| Hexachlorocyclohexane | " | 300–320 | 62 |
| Dimethyl-2,2-dichlorovinyl phosphate | " | 300–320 | 76 |
| N-(dichlorofluoromethylthio)-N,N-dimethylphenyl sulfamide | " | 280–300 | less than 30 |

It will be clearly seen from these results that the degradation of the active ingredients in aerosols can be almost perfectly reduced by the practice of the present invention, whereas the active ingredients are degraded to a considerable extent in the conventional processes. In fact a major portion of the active ingredients is inactivated by the processes of the prior art.

The following are among the reasons for the marked reduction of thermal degradation of pesticidal chemicals in accordance with the process of the invention:

1. According to the process of the invention, the pesticidal chemical is fixed and superheated steam is used as a flowing heat source. Hence, the pesticidal chemical is uniformly heated to a predetermined temperature without involving excessive heating.
2. The temperature of steam can be pre-set easily and strictly according to the thermal stability of the pesticidal chemical.
3. The vaporized pesticidal chemical is instantly released into the atmosphere, and cooled.
4. The steam used in the process of this invention serves to prevent degradation of the pesticidal chemical which may be caused by polymerization or condensation at the time of heating.

Another example will be given to demonstrate that the oxidative decomposition of the pesticides is greatly reduced with the process of this invention by employing sulfur, a fungicide, for example. A mixture of 10 g potassium nitrate, 5 g sugar, 2.5 g diatomaceous earth and 5 g of sulfur was ignited to form an aerosol of sulfur. Iodometrical analysis indicated that 54% of the sulfur used was oxidized to sulfur dioxide.

In still another test, 5 g sulfur was heated to form an aerosol of sulfur, at 220° C on an iron plate using a propane gas flame. It was found that 47.8% of sulfur was oxidized in the air sulfur dioxide.

It is evident from the results of these tests that the activity of sulfur as a fungicide is greatly reduced by the conversion of it to sulfur dioxide which takes place because of oxidation with air. The sulfur dioxide exerts seriout phytotoxic effects on plants and crops, which finally lead to the death of the plants.

A test was carried out in accordance with the process of the invention by passing 200 g of superheated steam at 25° C into 5 g of sulfur so as to release the sulfur into the air as a fine aerosol. The amount of sulfur dioxide formed at this time was only 0.05% by weight of the sulfur used. Damage to the plants or crops by sulfur dioxide was not observed at all, and the fungicidal activity of sulfur was completely maintained because the degradation of sulfur by oxidation was quite effectively prevented by the process of the invention.

As these comparative tests show, the process of this invention enables the heating of pesticides in an atmosphere of steam separated from oxygen, thereby preventing the inactivation of the pesticidal ingredients to be caused by oxidative degradation.

In the process of the present invention, the pesticidal chemical does not contact a reactive substance throughout the entire process of preparing an aerosol, and therefore, even at high temperatures, the pesticidal chemical does not degrade by reaction with foreign matter. It is generally known that most pesticidal chemicals are easily altered by the presence of an alkaline substance. It is also known that machine oil degenerates lime, dinitrocyclohexylphenol (DN), O-ethyl-O-paranitrophenyl phenylphosphonothioate (EPN), benzene hexachloride (BHC), p,p'-dichlorodiphenyl trichloroethane (DDT), etc., even at room temperature.

As will be seen from the foregoing description, the degradation of pesticidal chemicals atomized by the process of the present invention can be prevented almost completely. This can be substantiated from the fact that the process of the invention can be applied to N'-(dichlorofluromethylthio)-N,N-dimethylphenyl phenyl sulfamide, 6-methylquinoxaline-2,3-dithiocarbonate, 2-methoxy-4H-1,3,2-benzodioxaphosphorine-2-sulfide, etc., which have previously been unable to be made into an aerosol by heating. A further advantage of the present invention resides in the fact that any pesticidal chemical which is vaporizable can be made into aerosols by the process of the invention. This is the most outstanding feature of the invention, and ascribable to the fact that inert superheated steam is used alone to carry or entrain a vapor of a pesticidal chemical positively; superheated steam acts as a flowing heat source and heats a fixed zone of the pesticidal chemical uniformly.

It will be interesting to note that an attempt to make an aerosol of tetrachloroisophthalonitrile by passing a solution of 5 g of this compound in 100 cc of o-xylene through a heating coil heated at 350° C failed because of blockage of the apparatus.

6-Methylquinoxaline-2,3-dithiocarbonate, and N'-(dichlorofluromethylthio)-N,N-dimethyl phenylsulfamide could not be made into aerosols on a heated iron plate, but the process of the invention makes it possible to form aerosols of these cvhemicals without involving their degradation.

In other words, high melting solid pesticides can also be atomized by the process of this invention with safety by merely passing superheated steam held at a temperature lower than the decomposition temperature of the pesticide. This process does not cause the blockage of apparatus nor excessive heating.

If the vaporization speed of the pesticide is too slow and a fog of the pesticide is not formed in the air, the speed can be made greater by increasing the amount of steam, and this readily leads to the formation of a stable fog of the pesticide. Even with pesticidal chemicals unstable to heat, the process of this invention can produce aerosols of pesticides without causing decomposition, by using an increased amount of superheated steam at relatively low temperatures.

Another advantage of the process of this invention resides in the fact that the temperature of the superheated steam can be readily set to any desired value according to the thermal stability of the active ingredient because the temperature of the steam can be measured and controlled easily at any desired point.

A further advantage of the process of this invention is that extremely finely divided aerosols of pesticides can be produced. This is probably because the collision, aggregation and growth of the particles of the active ingredient are inhibited by the co-presence of steam particles. It is expected, therefore, that the activities of the pesticides against bacteria, mold spores, virus and other microorganisms can be greatly enhanced.

The pesticidal ingredients to be converted to aerosols by the process of this invention may be supported, if desired, on suitable solid materials, such as diatomaceous earth, silica gel, kaolin, talc, pumice stone, bentonite, etc., which are inert to the pesticidal ingredients.

Diluents and/or condensation nuclei such as mineral dusts, e.g. talc, may be effectively added.

The temperature of the steam may vary according to the thermal stabilities, vapor pressures, latent heats and other properties of the pesticidal ingredients to be entrained with it. In general, however, it is preferred to use a temperature of between 110° C and 800° C, particularly between 130° C and 500° C, depending upon the capacity of aerosol formation. Generally, when the steam temperature is lower than 110° C, the vaporization of the active ingredient becomes insufficient, and when it is higher than 800° C, the thermal decomposition of the active ingredient becomes significant.

The amount of steam to be added to the active ingredient varies greatly according to the steam temperature employed, but it is not critical. Usually, 5 to 200 moles or more of steam may be added, especially from the viewpoint of diffusion efficiency. Steam may be admixed with an inert gas such as carbon dioxide or nitrogen.

A better understanding of the present invention will be obtained from the following examples, which are merely illustrative and not limitative of the present invention.

EXAMPLE 1

An apparatus of the type shown in FIG. 1 equipped with a stainless steel pesticide evaporator having an inner diameter of 40 mm and a height of 100 mm was charged with a solid state mixture composed of 15 g of dimethyl-2,2-dichlorovinyl phosphate, 45 g of bentonite, and 40 g of diatomaceous earth. Three hundred grams of superheated stem at 230° C from a superheater was passed through the mixture over a period of 10 minutes thereby to vaporize and entrain the pesticide. The pesticide was atomized in a 500 m$^3$ volume vinyl resin house. After treatment for 12 hours, plant louse inhabiting eggplants grown in the house were killed 100% with no phytotoxicity to the eggplants.

EXAMPLE 2

An apparatus of the type shown in FIG. 2 equipped with a stainless steel pesticide evaporator having an inner diameter of 60 mm and a height of 180 mm was charged with a mixture composed of 80 g of N'-(dichlorofluoromethylthio)-N,N-dimethylphenyl sulfamide and 120 g of mineral clay. Valve 253 and valve 257 were properly adjusted, and 1,000 g of the resulting steam at 150°–160° C was passed through the pesticide thereby to vaporize and entrain it. The pesticide was atomized in 1,300 m$^3$ volume greenhouse. The application was made on the close of the day and the treated tomatoes cultivated in the house were left overnight to control leaf spot disease on the tomatoes. The pesticidal fog diffused uniformly throughout the house. One week later, the ratio of the infected leaves was reduced from 51% to 5.3%. No phytotoxicity was observed.

EXAMPLE 3

An apparatus of the type shown in FIG. 3 was charged with pesticidal grains 2.5 mm in diameter and 5 mm in length which had been prepared by shaping a mixture consisting of 12 g of 2.4-dichloro-6-(o-chloroanilino)-1,3,5-triazine and 12 g of bentonite. Water was dropped from a water tank or reservoir at a rate of 10 g per minute, and rapidly heated in a spiral heating tube. The resulting steam held at 110°-250° C was passed through the pesticide grains, which were then atomized in a 200 m³ volume vinyl resin house. The application of the pesticide fog was made three times. Consequently, the rate of infection, based on the actual number of infected fruits, of gray mold inhabiting carnations grown in the house was reduced from 35% to 2.1%. No phytotoxicity to the carnations was observed.

EXAMPLE 4

An aerosol generator having the same structure as shown in FIG. 4 was employed for fogging zinc-ethylene bisdithiocarbamate.

A stainless steel cylinder 100 mm in inner diameter and 500 mm in height was connected at its upper portion to a stainless spiral tube 5 mm in inner diameter and 300 mm in length fitted with a nichrome heater. The other end of the spiral tube was connected to a pesticide evaporator having an inner diameter of 30 mm and a height of 60 mm. The cylinder was charged with 100 cc of water and the evaporator was charged with 3.0 g of zinc-ethylene bisdithiocarbamate. The cylinder was heated by burning kerosene to evaporate water, and steam having a temperature of 110° to 300° C was generated from the spiral tube. By passing the superheated steam through the evaporator, an aerosol of the pesticidal ingredient was formed. The aerosol was then introduced into a sealed vinyl resin house of a volume of 30 m³ where sweetpeas were cultivated. The aerosol controlled powdery mildew on the sweetpeas with no phytotoxicity.

EXAMPLE 5

To a wire net basket of an aerosol generator shown in FIG. 1, 7.0 g of sulfur was attached, and 5.4 g of steam heated at 110°-210° C was passed through it for about 20 minutes to entrain the sulfur with steam. An aerosol so formed was sprayed throughout an enclosed glass chamber having a volume of 50 m³. After allowing to stand for 24 hours, powdery mildew parasitic on cucumbers grown in the chamber was controlled to an extent of 98%. No phytotoxic damage of the cucumber was noticed at all. The amount of sulfur dioxide formed at this time was only 0.0058%.

EXAMPLE 6

Using an apparatus of the type shown in FIG. 2, 1,000 g of superheated steam held at 450°-500° C was passed over 150 g of gammahexane carried on an equal amount of bentonite to form an aerosol of gammahexane entrained with steam.

A larch tree forest of an area of 990 m² was fumigated with the aerosol. After standing for 24 hours, the percentage of control of pine worms reached 80%. No injury to the larch trees by gammahexane was observed.

EXAMPLE 7

Using an aerosol generator having the same structure as shown in FIG. 3, 100 cc of water was dropped at a rate of 7 cc per minute, and superheated steam having a temperature of 100°-300° C so generated from the spiral tube was passed through a pesticide evaporator containing a mixture of 1.5 g of 6-methylquinoxaline-2,3-dithiocarbonate and 4.5 g of talc. The aerosol so formed was introduced into a sealed greenhouse of a volume of 30 m³ where sweetpeas were cultivated. The spore germination of powdery mildew was controlled to an extent of 2.4 g with no phytotoxicity to the sweetpeas.

EXAMPLE 8

An aerosol generator having the same structure as shown in FIG. 4 was charged with 100 cc of water in the cylinder, 1.5 g of N-tetrachloroethylthiotetrahydrophthalimide carried on diatomaceous earth in the evaporator and heated with a nichrome heater to generate steam which was further heated in the spiral tube at 110°-250° C and passed to the pesticide evaporator to form an aerosol. A vinyl resin greenhouse of a volume of 20 m³ was fumigated with the aerosol. As a result, a gray mold on tomatoes grown in the greeenhouse was controlled with excellent results. No phytotoxicity to the tomatoes was observed.

EXAMPLES 9-27

A number of tests were carried out showing the fungicidal and insecticidal effect and phytotoxic effect by varying the kind of plants to be treated with smoke, the temperature of steam fed and kind of the active ingredients. The results are given in the following table.

Table

| Example | Production of superheated steam | Temperature of steam (° C) | Pesticidal ingredients | Dosage of each application (g/m³) | Total number of applications | Crop | Diseases or insects | Degree of control | Phytotoxicity |
|---|---|---|---|---|---|---|---|---|---|
| 9 | Electrical heating of water (FIG. 3) | 130-210 | Dimethyl-2,2-dichlorovinyl phosphate | 0.027 | once | Carnation | Red spinder | 98% adults killed | None |
| 10 | " | 210-300 | γ-Hexachlorocyclohexane | 0.039 | once | Eggplant | Plant louse | 97% killed | None |
| 11 | " | 350-450 | N-tetrachloroethylthiotetrahydrophthalimide | 0.076 | 3 | Tomato | Gray mold | Almost equal compared with wettables | None |
| 12 | " |  | " | 0.088 | 4 | Tomato | Late blight | " | None |
| 13 | Electrical heating of water (FIG. 4) | 300-500 | Tetrachloroisophthalo- | 0.088 | 4 | Cucumber | Downey mildew | Better than wettables | None |

Table-continued

| Example | Production of superheated steam | Temperature of steam (°C) | Pesticidal ingredients | Dosage of each application (g/m³) | Total number of applications | Crop | Diseases or insects | Degree of control | Phytotoxicity |
|---|---|---|---|---|---|---|---|---|---|
| 14 | " | 400–600 | nitrile " | 0.060 | twice | Cucumber | Powdery mildew | Excellent control | None |
| 15 | " | 350–400 | " | 0.088 | 3 | Tomato | Leaf mold | Good control | None |
| 16 | Heating of water by gas flame (petroleum) (FIG.1) | 400–500 | 2,4-dichloro-6-(o-chloranilino)-1,3,5-triazine | 0.068 | twice | Cyclamen | Gray mold | Excellent control | None |
| 17 | " | | " | 0.060 | 4 | Cucumber | Scab | " | None |
| 18 | " | | " | 0.060 | twice | Tomato | Leaf mold | " | None |
| 19 | Heating of water by propane gas flame (FIG. 2) | 270–300 | 2,4-Dichloro-4-nitroaniline | 0.018 | twice | Cucumber | Stem rot | " | None |
| 20 | | | | | | | | | |
| 21 | Heating of water by propane gas flame (FIG. 2) | 330–400 | 6-Methylquinoxaline-2,3-dithiocarbonate | 0.050 | twice | Muskmelon | Stem rot | Excellent control | None |
| 22 | " | | " | 0.050 | 3 | Green pepper | " | " | None |
| 23 | " | | " | 0.140 | twice | Grape | Red spider | 80% of adults killed | None |
| 24 | Heating of water by ignition flare of methanol (FIG. 1) | 210–280 | 3,3-Ethylenebis(tetrahydro-4,6-dimethyl-2H-1,3,5-thiadiazine-2-thione | 0.091 | 3 | Tomato | Downey mildew | Good control | None |
| 25 | Heating of water by ignition flame of methaldehyde (FIG. 1) | 310–350 | N-trichloromethyl-thiotetrahydrophthalimide | 0.076 | 3 | Cucumber | Gray mold | " | None |
| 26 | " | 310–350 | " | 0.091 | 4 | Tomato | Leaf mold | " | None |
| 27 | Heating of water by propane gas flame (FIG. 1) | 180–210 | O,O-diethyl-2-isopropyl-4-methylpyrimidyl-(6)-thionophosphate | 0.027 | once | Strawberry | Red spider | 90% adults killed | None |

Although the present invention has been adequately discussed in the foregoing specification and claims, it is readily apparent that various changes and modifications can be made without departing from the spirit and scope thereof.

What is claimed is:

1. A process for applying an insecticidal or fungicidal chemical to living plants in an enclosed area which comprises:
  1. passing superheated steam having a temperature of from 110° C. – 800° C., through a vaporizable solid state insecticidal or fungicidal chemical thereby to evaporate said chemical, said superheated steam being the means employed to heat said chemical;
  2. subsequently rapidly releasing the resulting entrained vapor into the air to rapidly cool said vapor and to form an aerosol of the insecticidal or fungicidal chemical in the vicinity of said living plants, and
  3. then contacting said living plants with an insecticial or fungicidal amount of said chemical in the form of said aerosol.

2. The process of claim 1, wherein the pesticidal chemical is an insecticide.

3. The process of claim 1, wherein the pesticidal chemical is a fungicide.

4. The process of claim 1, wherein the solid state pesticidal chemical is supported on an inactive solid material.

5. The process of claim 1, wherein the aerosol is formed in a greenhouse.

6. The process of claim 1, wherein said temperature range is from 130° C. to 500° C.

7. The process of claim 1, wherein said steam is present in an amount of from 5.0 to 200 moles.

8. The process of claim 1, wherein said steam is added in admixture with an inert gas.

9. The process of claim 8, wherein said inert gas is a member selected from the group consisting of carbon dioxide and nitrogen.

10. The process of claim 1, wherein said solid state pesticidal chemical is a member selected from the group consisting of sulfur, 2,2-dichloro-6(o-chloroanilino)-1,3,5-triazine, hexcyclohexane dimethyl-2,2-dichlorovinyl phosphate, tetrachloroisophthalonitril, 6-methylquinoxaline-2,3-dithiocarbonate, dimethyl-(3-methyl-4-nitrophenyl) thiophosphate, ethyl-p-cyanophenylphenylphosphonothioate, 2-isopropyl-4-methylpyrimdyl-6-diethylthiophosphate, N'-(dichlorofluoromethylthio)-N,N-dimethylphenyl sulfamide, 2-methoxy-4H-1,3,2-benzodioxaphosphorine-2-sulfide, and 3-(3,5-dichlorophenyl)-5,5-dimethyloxazolinedione-2,4.

* * * * *